United States Patent [19]
Bartlett et al.

[11] 3,832,551
[45] Aug. 27, 1974

[54] RADIATION GAGE WITH SAMPLE AND HOLD FEATURE IN DEVIATION MEASURING CIRCUIT

[75] Inventors: William G. Bartlett, Stockertown; Edmund L. Mangan, Bethlehem, both of Pa.

[73] Assignee: Bethlehem Steel Corporation, Bethlehem, Pa.

[22] Filed: June 22, 1972

[21] Appl. No.: 265,140

[52] U.S. Cl. ............................... 250/359, 250/358
[51] Int. Cl. ........................................... G01n 23/02
[58] Field of Search ....... 250/83.3 D, 358, 359, 360

[56] References Cited
UNITED STATES PATENTS

| | | | |
|---|---|---|---|
| 3,482,098 | 12/1969 | Mangan | 250/83.3 D |
| 3,518,430 | 6/1970 | Davis | 250/83.3 D |
| 3,524,063 | 8/1970 | Mangan | 250/83.3 D |
| 3,639,763 | 2/1972 | Streng | 250/83.3 R X |
| 3,648,035 | 3/1972 | Hart et al. | 250/83.3 D X |

*Primary Examiner*—Archie R. Borchelt

[57] ABSTRACT

Utility of a radiation gage having a direct-reading measuring circuit for determining a material property, such as thickness, density, or weight-per-unit area, is extended by use of a thickness deviation measuring circuit arrangement. In a thickness deviation gage, for example, the latter circuit arrangement includes a sample-and-hold circuit for automatically storing an initial thickness signal detected when the material first enters the gage, and a difference amplifier for comparing instantaneous or subsequent thickness signals with the stored thickness signal and producing a thickness deviation signal. The thickness deviation signal plus the stored and instantaneous thickness signals are fed separately to utilization devices such as indicators and recorders as used in the thickness profile analysis of said material from end-to-end, or said thickness deviation signals may provide a control signal in an automatic control system.

7 Claims, 2 Drawing Figures

RADIATION GAGE WITH SAMPLE AND HOLD FEATURE IN DEVIATION MEASURING CIRCUIT

BACKGROUND OF THE INVENTION

1. Field of the Invention

This invention relates broadly to radiation gages for determining a material property such as deviation in material thickness, density, or weight-per-unit area. More particularly, this invention relates to a radiation gage which provides a material property deviation signal based on the difference between instantaneous values of the material property gaging signal and a stored value of an initial gaging signal detected when the material first entered the radiation gage. The invention will be described herein with reference to a hot steel rolling mill where the radiation gage provides thickness deviation signals of steel plate or moving strip. These signals are ultimately fed to plate or strip profile analysis equipment, or fed as control signals to an automatic gage control system. However, the invention is equally applicable in a variety of other industrial and laboratory installations, as well as to gaging properties of other materials.

2. Description of the Prior Art

Presently in hot steel rolling mills, for example, X-ray gages are used to gage the thickness of steel plate or strip products and feed a thickness signal to automatic gage control systems incorporated in the production facilities. One commercially available X-ray gage for this purpose is described by E. L. Mangan in U. S. Pat. No. 3,524,063. Other X-ray gages are also available commercially. The Mangan X-ray gage as well as other gages, is a thickness deviation gage. That is, it produces a thickness deviation signal based on the difference between instantaneous thickness gaging signals and a nominal or desired thickness signal which is changes into the gage by an operator or otherwise preset therein by action of a process control computer.

Frequently, determining the proper value of the nominal thickness signal is a somewhat complicated procedure and at times is extremely difficult. For example, consideration must be given to the steel product thickness property during various hot rolling stages as well as to the finished product thickness when cooled. Further, consideration must be given to the effects of variations in steel product composition and temperature properties on thickness deviation gaging, such as is disclosed by E. L. Mangan in U. S. Pat. No. 3,482,098. Moreover, additional consideration must be given to the effects of variations within rolling system mechanical and control equipment and to the canges in steel product characteristics during rolling. Thus, when considering all of these factors, it is unlikely that an accurate and reliable nominal thickness signal can be developed for radiation thickness deviation gages prior to gaging each different kind of steel plate or strip that is encountered in contemporary steel rolling mills.

SUMMARY OF THE INVENTION

One of the objects of this invention is to provide improved radiation gaging apparatus for overcoming a substantial number of the foregoing difficulties.

Another object of this invention is to provide radiation gaging apparatus for determining deviation of a material property from a nominal value established when the material enters the gaging apparatus, thereby eliminating the need for presetting the gaging apparatus with the prior art nominal thickness signal before gaging.

A further object of this invention is to provide radiation gaging apparatus for determining thickness deviation of a steel plate or strip which automatically establishes an initial thickness signal at a preselected time after the steel product enters said gage and for providing an output signal that represents deviation of instantaneous or subsequent thickness signals from the initial thickness signal.

The foregoing objects can be attained by radiation gaging apparatus having commercially available components such as a source of radiation, radiation detectors and measuring circuits which continuously produce a direct-reading thickness signal proportional to the thickness of the material to be gaged, such as steel plate or strip. The apparatus further includes thickness deviation measuring circuits which provide a material deviation signal based on the difference between instantaneous thickness signal values and a stored thickness signal of the initial thickness signal detected when the material first entered the gage.

DESCRIPTION OF THE PREFERRED EMBODIMENT

Figure 1:
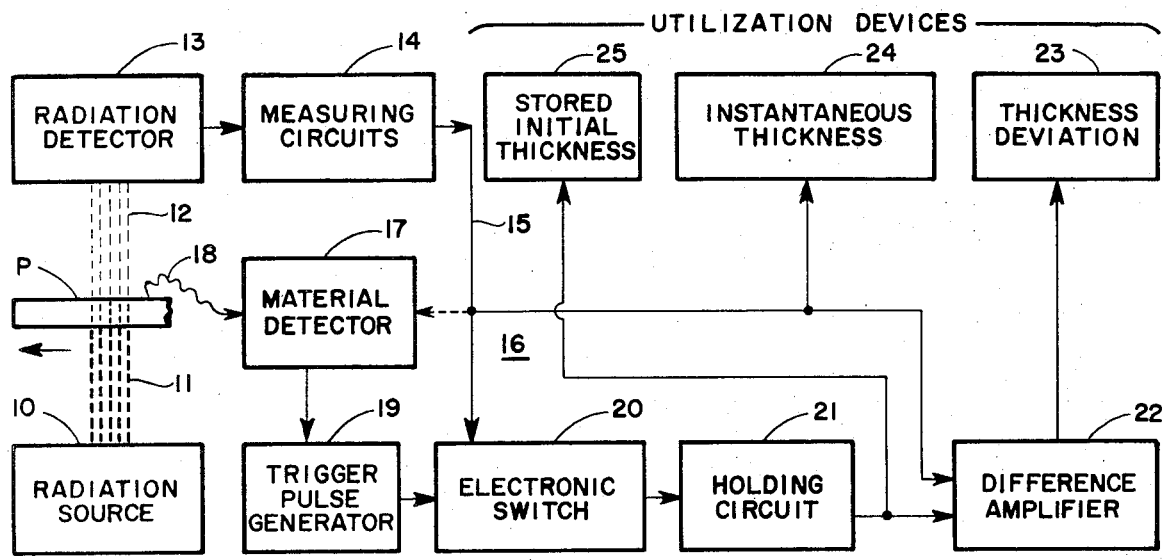
FIG. 1 is a block diagram of a radiation gaging system which incorporates the present invention.

Referring to FIG. 1, a radiation gaging system is shown wherein commercially available radiation source 10 directs a beam of penetrative radiation 11 through a steel product such as plate P. While passing through plate P, radiation beam 11 is subject to attenuation which varies exponentially according to the well known mass absorption phenomenon. Subsequently, this beam of radiation becomes known as a beam of emergent radiation 12 which is imaged upon a conventional radiation detector 13.

Radiation detector 13 converts emergent radiation 12 into a direct-reading electrical signal which is applied to well known measuring circuits 14. Measuring circuits 14 include the necessary circuitry to produce an electronic thickness signal which varies substantially linearly from the equivalent of zero to full scale proportional to the thickness of plate P. For convenience the linear thickness signal may be scaled to engineering units, i.e., 3.000 volts for 3.000 inches thickness of plate P.

The linear thickness voltage is fed over lead 15 to thickness deviation measuring circuit arrangement 16. The latter circuit arrangement includes material detector 17 which is adapted to detect the presence of plate P, either electro-optically such as by sensing infrared radiation 18 emitted by plate P, or alternatively, by sensing a predetermined change in the linear thickness voltage on lead 15 (shown dotted in FIG. 1). When plate P enters radiation beam 11, material detector 17 issues a material presence pulse to trigger pulse generator 19. Here conventional time delay circuitry generates a triggering pulse of prescribed duration after a short time interval of sufficient duration for the thickness gaging circuits to stabilize and produce a thickness voltage on lead 15.

Electronic switch 20 is caused to conduct the thickness voltage on lead 15 to a conventional holding circuit 21 in response to the triggering pulse produced by trigger pulse generator 19. Electronic switch 20 and holding circuit 21 comprise a commercially available sample-and-hold device. The prescribed duration of the triggering pulse corresponds to the duration required to charge a capacitor in holding circuit 21 so as to store an initial thickness voltage in this circuit. At the end of the triggering pulse electronic switch 20 is opened and holding circuit 21 maintains the initial thickness voltage therein.

Instantaneous values of plate P thickness, that is, those values subsequent to the initial thickness of plate P detected after first entering radiation beam 11, appear as a continuous thickness voltage on lead 15. The instantaneous thickness voltage, together with the stored initial thickness voltage, are fed to difference amplifier 22, which is preferably an operational summing amplifier having one input grounded and the other input adapted to receive the algebraic sum of the instantaneous and initial thickness voltages. The output of amplifier 22 is a voltage proportional to the thickness deviation of the instantaneous thickness of plate P from an initially stored value in holding circuit 21.

Utilization device 23, which may be a digital indicator or a strip chart recorder, receives the thickness deviation voltage from amplifier 29 and provides a measure of plate P thickness profile which is valuable to a rolling mill operator for setting roll spacings. Utilization devices 24 and 25, which may also be digital indicators or strip chart recorders, provide a measure of the instantaneous and initial thickness values of plate P, respectively. Alternatively, utilization devices 23, 24 and 25 may constitute one or more inputs of an automatic gage control system which requires a thickness deviation voltage, an instantaneous thickness voltage, and/or an initially stored value of thickness voltage representing plate P.

Figure 2:
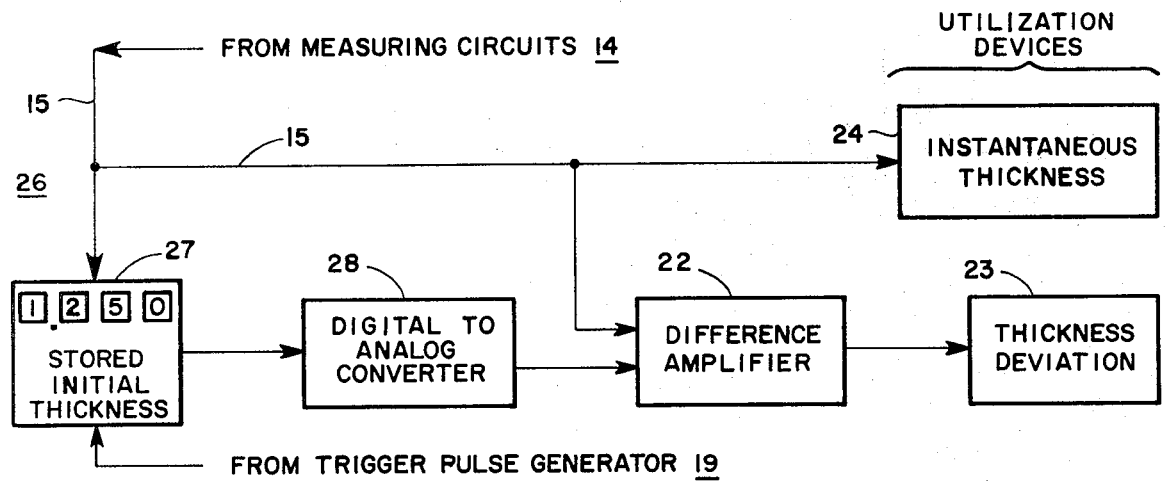
FIG. 2 is a block diagram of a modification of the embodiment shown in FIG. 1.

Turning now to FIG. 2, there is shown thickness deviation circuit arrangement 26, which is a modification of the corresponding circuit arrangement 16 shown in FIG. 1, and is slightly more sophisticated but more accurate than circuit arrangement 16. Thickness deviation circuit arrangement 26 includes a conventional digital voltmeter 27, calibrated in terms of thickness of plate P and fed the instantaneous thickness voltage over lead 15 from measuring circuits 14 shown in FIG. 1. Material detector 17 shown in FIG. 1 feeds the material presence pulse to trigger pulse generator 19 also shown in FIG. 1. The latter sends the triggering pulse to digital voltmeter 27 which stores and maintains an indication of initial thickness of plate P in response to the triggering pulse, i.e., when plate P first enters radiation beam 11.

Digital voltmeter 27 also is adapted to provide a digital output voltage representing the stored initial thickness of plate P. This digital output voltage is fed to a conventional digital-to-analog converter 28 and the resulting analog voltage which represents initial thickness of plate P is fed together with the instantaneous thickness voltage on lead 15 to difference amplifier 22 which is the same as shown in FIG. 1. Output from difference amplifier 22 is a thickness deviation voltage which is fed to utilization device 23 as shown in FIG. 1.

The instantaneous thickness voltage appearing on lead 15 is also fed to utilization device 24 also as shown in FIG. 1.

We claim:

1. A radiation gage for determining deviation of a material property from a nominal value, comprising:
   a. a source of penetrative radiation beamed at one side of said material,
   b. means including a detector responsive to radiation emerging from said material for producing a direct-reading electronic gaging signal which varies proportional to said material property,
   c. measuring circuit means for producing a material property deviation signal based on the difference between instantaneous values of said material property gaging signal and a nominal value thereof established by storing an initial value of said gaging signal detected when said material first enters said gage, and
   d. utilization means for determining the amount of deviation of instantaneous values of said material property gaging signal from said stored initial value thereof.

2. A radiation gage for determining deviation of a material property from a nominal value, comprising:
   a. a source of penetrative radiation beamed at one side of said material,
   b. means including a detector responsive to radiation emerging from said material for producing a direct-reading electronic gaging signal which varies proportional to said material property,
   c. deviation measuring circuit means comprising:
      1. material presence detector means for producing a triggering pulse when said material enters said gage,
      2. circuit means including a switch responsive to said triggering pulse and further including a holding circuit controlled by said switch for storing an initial value of said material property gaging signal so as to establish a nominal value thereof,
      3. an amplifier receiving both instantaneous values and said stored value of said material property gaging signals for producing a deviation signal proportional to the algebraic difference between said input signals, and
   d. utilization means for determining the amount of deviation on instantaneous values of said material property gaging signal from said stored initial value thereof.

3. The apparatus of claim 2 wherein said material presence detector means is adapted to respond to optical radiation from said material being gaged.

4. The apparatus of claim 2 wherein said material presence detector means is adapted to respond to a predetermined change in said material property gaging signal.

5. The apparatus of claim 2 wherein said utilization means further includes at least one additional means for determining the amount of said initially stored value, or said instantaneous values, or both of said values of said material property gaging signal.

6. A radiation gage for determining deviation of a material property from a nominal value, comprising:
   a. a source of penetrative radiation beamed at one side of said material,
   b. means including a detector responsive to radiation emerging from said material for producing a direct-reading electronic gaging signal which varies proportional to said material property, c. deviation measuring circuit means comprising:
  1. material presence detector circuit for producing a triggering pulse when said material enters said gage,
  2. circuit means receiving said material property gaging signal and acting in response to said triggering pulse for storing an initial digital value of said gaging signal to establish a nominal value thereof, said circuit producing a digital output signal of said stored initial value of said gaging signal,
  3. a digital-to-analog converter receiving said stored digital signal and producing a stored analog signal corresponding thereto,
  4. an amplifier receiving both instantaneous values and said stored analog value of said material property gaging signals for producing a deviation signal proportional to the algebraic difference between said input signals, and d. utilization means for determining the amount of deviation of instantaneous values of said material property gaging signal from said stored initial value thereof.

7. The apparatus of claim 6 wherein said utilization means further includes means for determining the amount of said instantaneous material property gaging signal.

* * * * *

UNITED STATES PATENT OFFICE
CERTIFICATE OF CORRECTION

Patent No. 3,832,551 Dated August 27, 1974

Inventor(s) William G. Bartlett and Edmund L. Mangan

It is certified that error appears in the above-identified patent and that said Letters Patent are hereby corrected as shown below:

Column 1, line 36, "changes" should read -- dialed --.

Signed and sealed this 26th day of November 1974.

(SEAL)
Attest:

McCOY M. GIBSON JR.
Attesting Officer

C. MARSHALL DANN
Commissioner of Patents